United States Patent
Xia et al.

(10) Patent No.: US 11,756,506 B2
(45) Date of Patent: Sep. 12, 2023

(54) METHOD AND DEVICE FOR ADJUSTING IMAGE QUALITY, AND READABLE STORAGE MEDIUM

(71) Applicant: Shenzhen TCL Digital Technology Ltd., Guangdong (CN)

(72) Inventors: Daxue Xia, Guangdong (CN); Linjun He, Guangdong (CN); Renli Xie, Guangdong (CN)

(73) Assignee: Shenzhen TCL Digital Technology Ltd., Shenzhen (CN)

( * ) Notice: Subject to any disclaimer, the term of this patent is extended or adjusted under 35 U.S.C. 154(b) by 0 days.

(21) Appl. No.: 17/618,518

(22) PCT Filed: May 15, 2020

(86) PCT No.: PCT/CN2020/090597
§ 371 (c)(1),
(2) Date: Dec. 13, 2021

(87) PCT Pub. No.: WO2020/259123
PCT Pub. Date: Dec. 30, 2020

(65) Prior Publication Data
US 2022/0351701 A1 Nov. 3, 2022

(30) Foreign Application Priority Data
Jun. 27, 2019 (CN) .......................... 20191056986.X

(51) Int. Cl.
*G09G 5/10* (2006.01)
(52) U.S. Cl.
CPC ....... *G09G 5/10* (2013.01); *G09G 2320/0686* (2013.01)

(58) Field of Classification Search
CPC ............. G09G 5/10; G09G 2320/0686; G09G 2320/0673; G09G 2354/00; G06T 5/007; H04N 5/20; H04N 5/14; H04N 9/646
See application file for complete search history.

(56) References Cited

U.S. PATENT DOCUMENTS 7,251,056 B2 * 7/2007 Matsushima ........... G06T 7/194
358/1.9
10,176,561 B2 1/2019 Evans et al.
(Continued)

FOREIGN PATENT DOCUMENTS

| CN | 101739672 | 6/2010 |
| CN | 103778599 | 5/2014 |

(Continued)

OTHER PUBLICATIONS

WO-2019/111659, Okiyama, Image Processing Device, Imaging Device, Image Processing Method, and Program, Jun. 13, 2019 (Year: 2019).*

(Continued)

*Primary Examiner* — Rodney Amadiz

(57) ABSTRACT

The disclosure provides a method, device, and readable storage medium for adjusting image quality. The display device system selects a focus area of a target image, and outputs a mapping relationship curve of an input luminance value and an output luminance value of the target image. Then, an input luminance value range of pixels in the focus area of the target image is calculated, and upper and lower edge coefficients of the input luminance value range are proportionally adjusted to obtain new upper and lower edge coefficients. The mapping relationship curve is adjusted according to the new upper and lower edge coefficients, thereby adjusting the focus area of the target image.

12 Claims, 2 Drawing Sheets

(56) References Cited

U.S. PATENT DOCUMENTS

| | | | |
|---|---|---|---|
| 11,138,701 B2 | 10/2021 | Wang | |
| 2011/0026051 A1 | 2/2011 | Wang | |
| 2012/0114267 A1* | 5/2012 | Park | G06T 5/009 |
| | | | 382/274 |
| 2015/0085322 A1* | 3/2015 | Masaru | G06K 15/1878 |
| | | | 358/3.21 |
| 2016/0358584 A1 | 12/2016 | Greenebaum et al. | |
| 2017/0011692 A1 | 1/2017 | Lee et al. | |
| 2017/0228854 A1* | 8/2017 | Cauvin | G06T 5/002 |
| 2018/0247396 A1* | 8/2018 | Pouli | G06T 7/90 |
| 2019/0253637 A1* | 8/2019 | Savoie | H04N 21/44 |
| 2020/0304723 A1* | 9/2020 | Okiyama | H04N 23/60 |

FOREIGN PATENT DOCUMENTS

| | | | |
|---|---|---|---|
| CN | 106897963 | 6/2017 | |
| CN | 108280836 | 7/2018 | |
| CN | 108391111 | 8/2018 | |
| CN | 109272459 | 1/2019 | |
| CN | 109685746 | 4/2019 | |
| WO | WO-2019111659 A1 * | 6/2019 | G03B 15/00 |

OTHER PUBLICATIONS

International Search Report and the Written Opinion dated Aug. 26, 2020 From the International Searching Authority Re. Application No. PCT/CN2020/090597 and Its Translation of Search Report Into English. (8 Pages).

Notification of Office Action dated May 7, 2021 From the State Intellectual Property Office of the People's Republic of China Re. Application No. 201910569860.X and Its Translation of Office Action Into English. (17 Pages).

Ji et al., "Method of Local Brightness Adjusting of Pigpen Image", Transactions of the Chinese Society of Agricultural Engineering, 29(5):139-146, Mar. 1, 2013.Chinese document.

Supplementary Partial European Search Report and the European Search Opinion dated Mar. 9, 2023 From the European Patent Office Re. Application No. 20833595.0. (16 Pages).

\* cited by examiner

METHOD AND DEVICE FOR ADJUSTING IMAGE QUALITY, AND READABLE STORAGE MEDIUM

RELATED APPLICATIONS

This application is a National Phase of PCT Patent Application No. PCT/CN2020/090597 having International filing date of May 15, 2020, which claims the benefit of priority of Chinese Patent Application No. 201910569860.X filed on Jun. 27, 2019. The contents of the above applications are all incorporated by reference as if fully set forth herein in their entirety.

FIELD AND BACKGROUND OF THE INVENTION

The present disclosure relates to the field of image communication, and more particularly, to a method, device, and readable storage medium for adjusting image quality.

High dynamic range (HDR) imaging is an image displaying technology emerging in recent years. Compared with normal imaging technologies, the HDR imaging technology can provide more dynamic ranges and image details and better reflect visual effects of real environments. The HDR imaging technology may meet users' demands for viewing experience of watching high-quality movies and TVs. However, the existing HDR technologies cannot fully satisfy users' demands for colorful and exquisite images with great sense of level, because different users have different concerns or areas of interest for different scenes or images. Unfortunately, the existing HDR technologies adjust images mechanically, not intelligently according to different environments or scenes.

Therefore, current technologies still require improving and developing.

SUMMARY OF THE INVENTION

In view of the above-mentioned shortcomings of the prior arts, the present disclosure provides a method for intelligently adjusting image quality that can adjust a current display image to partially enhance image quality according to personal interests.

The technical solution used in the present application to solve the above technical problems is detailed in the following:

A method for adjusting image picture quality for a display device to intelligently enhance regional display quality, comprising the steps of:
selecting by a display device system a focus area of a target image;
outputting a mapping relationship curve of an input luminance value and an output luminance value of the target image;
calculating an input luminance value range of pixels in the focus area of the target image and proportionally adjusting upper and lower edge coefficients of the input luminance value range to obtain new upper and lower edge coefficients; and
adjusting the mapping relationship curve according to the new upper and lower edge coefficients for adjusting the focus area of the target image.

As a further improved technical solution, the focus area of the target image selected by the display device system is a central area in an image display of the target image.

As a further improved technical solution, when resolution of a current image is 3840×2160, the pixels in the corner areas of the selected central area are generally located in pixel ranges $1600<x<2260$ and $900<y<1260$, where x is the coordinate in the length direction of the image, y is the coordinate in the width direction of the image, and the origin of coordinates of the image display is at the upper left corner.

As a further improved technical solution, the focus area of the target image selected by the display device system is an image of interest.

As a further improved technical solution, the image area of interest is obtained through artificial intelligence training.

As another further improved technical solution, the image area of interest is an image area that is recognized through big data collection.

As another further improved technical solution, the outputting the mapping relationship curve of the input luminance value and the output luminance value of the target image comprises calculating using a linear Bézier curve to initially describe the mapping relationship curve of the input luminance value and the output luminance value.

As another further improved technical solution, the calculating the input luminance value range of the pixels in the focus area of the target image and proportionally adjusting the upper and lower edge coefficients of the input luminance value range to obtain the new upper and lower edge coefficients comprises:
determining an upper limit value and a lower limit value of a Bézier curve of a ratio of the input luminance value and a maximum input luminance value of the pixels in the focus area of the target image; and
proportionally scaling up or down interval upper and lower edge coefficients which are determined according to an upper limit value and the lower limit value to obtain the new upper and lower edge coefficients.

As another further improved technical solution, the linear Bézier curve is preferably implemented by a fifth-order linear Bézier curve.

As another further improved technical solution, the 5th-order linear Bézier curve is described as $Lt=Ltmax \times \Sigma C(N,k) \times L0^k \times (1-L0)^{(N-k)} \times pk$, wherein $C(N,k)$ indicates permutations of k elements among N (N=5) elements, Ltmax represents a maximum output luminance supported by a current display device, L0 represents a ratio of the input luminance value to the maximum input luminance value, k iterates from 1 to 5, and pk represents a sequence of coefficients, initially, $pk=k/5$, the input is correlated with the output in a linear relationship, and the luminance ratio L0 is divided into five equal intervals.

As another further improved technical solution, the interval upper and lower edge coefficients are scaled up or down proportionally based on an adjustment factor which is selected based on conditions of images.

As another further improved technical solution, by applying the above adjusted upper and lower edge coefficients to the mapping relationship between the input luminance and the output luminance of the focus area of the image expressed by the fifth-order linear Bézier curve, luminance and contrast of the image can be adjusted in real-time.

As another further improved technical solution, the image area that is recognized through the artificial intelligence training or the big data collection is customized by a user according to specific requirements for image recognition.

The present application also provides a device for adjusting image quality that comprises a processor and a memory communicatively connected to the processor. The memory stores a computer program, and the computer program is executed by the processor to perform the steps of the above method.

The processor is configured to call the computer program in the memory to perform the steps of the method for adjusting image quality.

The present application further provides a readable storage medium. The readable storage medium stores a program for adjusting image quality. The program for adjusting image quality, when being executed by a processor, realizes the steps of the method for adjusting image quality.

Compared with current HDR image quality adjustment technologies, the present disclosure uses artificial intelligence technologies to set an image area that a user is interested in as the focus area of the target image, to represent the input luminance value range of the pixels in the focus area of the target image using a linear Bézier curve, and to scale up or down the contrast level of the image through adjusting the order of the linear Bézier curve or changing the adjustment factor for the upper and lower edge coefficients of the input luminance value range. The linear Bécurve is utilized to ensure smoothness and continuity in luminance adjustment and also ensure coherence of image display after the image adjustment. By improving the contrast level of the specific area of the image, the image quality becomes brighter and more colorful. The method is simple while can meet the requirements of real-time adjustment, and does not require additional hardware, reducing the cost.

BRIEF DESCRIPTION OF THE SEVERAL VIEWS OF THE DRAWINGS

Detailed description of the embodiments of the present application is given in the following with accompanying drawings.

FIG. 3-1 is an example 1 of an original image without image quality adjustment using a method of adjusting image quality of the present disclosure;

FIG. 3-2 is an example 2 of an image which is obtained from the image of FIG. 3-1 adjusted using a method of adjusting image quality of the present disclosure;

FIG. 4-1 is an example 3 of an original image without image quality adjustment using a method of adjusting the image quality of the present disclosure; and FIG. 4-2 is an example 4 of an image which is obtained from the image of FIG. 4-1 adjusted using a method of adjusting image quality of the present disclosure.

DESCRIPTION OF SPECIFIC EMBODIMENTS OF THE INVENTION

To make the object, technical solution, and advantages of the present disclosure clearer and more comprehensible, the present disclosure is described in further detail hereinafter with reference to the accompanying drawings and by way of example. It should be understood that the specific embodiments described herein are intended only to explain not limit the present disclosure.

The present disclosure provides an image recognition technology using artificial intelligence to adjust a specific area of an image according to the features recognized by the artificial intelligence, thereby enhancing exquisiteness and sense of organization of a part of the image and improving the image quality. For example, in an application where image quality of movies or TV is enhanced, a certain portion of an image needs to be emphasized, or in the criminal investigation of the police, a portrait of one person needs to be partially highlighted. For these specific application environments requiring image quality enhancement, users may perform a setting operation on some specific images of interest in advance. The setting operation can be achieved through big data or artificial intelligence in the related art. Then, image display of the specific images can be enhanced through the method of the present disclosure during video playback or image browsing, so as to achieve the purpose of intelligently enhancing image quality of a specific area.

Figure 1:
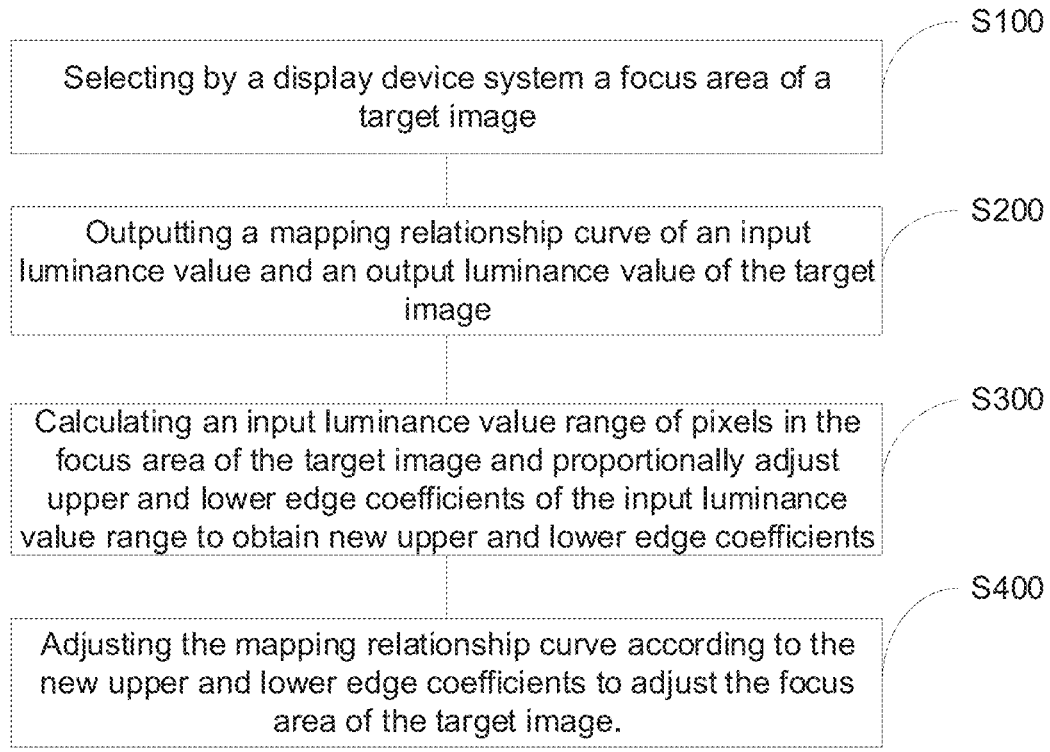
FIG. 1 is a flow chart of a method for adjusting image quality according to a preferred embodiment of the present disclosure.

FIG. 1 is a flow chart of a method for adjusting image quality according to a preferred embodiment of the present disclosure. As shown in FIG. 1, the method of the preferred embodiment comprises the following steps:

Step 100: selecting by a display device system a focus area of an image.

Specifically, the focus area of the image selected by the display device system is the central area or an image area of interest in image display of the image. The adjustment of the image quality mainly comprises adjusting the luminance and the contrast level. The image area of interest in the technical solution of the present disclosure is an image area that is recognized through artificial intelligence training or big data collection. For example, in a certain image, the central area of the image display generally serves as the focus area of the image. When the resolution of the current image is 3840× 2160, the pixels in the corner areas of the selected central area are generally located in pixel ranges 1600<x<2260 and 900<y<1260, where x is the coordinate in the length direction of the image, y is the coordinate in the width direction of the image, and the origin of coordinates of the image display is at the upper left corner. Of course, the central area of the image display here is only an example. Any modification can be appropriately performed in the range according to the resolution of the image display, so that the central area is suitable for images with different resolutions. In addition, the image area of interest can be set by means of artificial intelligence training or collected big data. For example, in the field of the criminal investigation of the police, facial features can be extracted and learned as the basis for subsequent image adjustments. The schemes and methods of artificial intelligence learning belong to state of the art technology, and are not repeated here.

Step S200: outputting a mapping relationship curve of an input luminance value and an output luminance value of the target image.

Specifically, the step of outputting the mapping relationship curve of the input luminance value and the output luminance value of the target image is performed by calculating using a linear Bécurve to initially describe the mapping relationship curve of the input luminance value and the output luminance value.

In the technical solution of the present disclosure, the linear Bézier curve is preferably implemented by a fifth-order linear Bézier curve. Of course, the order of the linear Bézier curve can be selected based on requirements, which can be determined according to different conditions of the image. For example, the 5th-order linear Bézier curve is described as $Lt = Ltmax \times \Sigma C(N,k) \times L0^k \times (1-L0)^{(N-k)} \times pk$, wherein $C(N,k)$ indicates permutations of k elements among N (N=5) elements, Ltmax represents the maximum output luminance supported by a current display device, L0 represents a ratio of the input luminance value to the maximum input luminance value, k iterates from 1 to 5, and pk represents the sequence of coefficients, initially, pk=k/5. There is a linear relationship between the input and the output, and the luminance ratio L0 is divided into five equal intervals.

Step S300: calculating the input luminance value range of the pixels in the focus area of the target image and proportionally adjusting the upper and lower edge coefficients of the input luminance value range to obtain new upper and lower edge coefficients.

Specifically, the step of calculating the input luminance value range of the pixels in the focus area of the target image and proportionally scaling up or down the upper and lower edge coefficients of the input luminance value range to obtain new upper and lower edge coefficients comprise the following steps:

determining an upper limit value and a lower limit value of the Bézier curve of the ratio of the input luminance value and the maximum input luminance value of the pixels in the focus area of the target image, and proportionally scaling up or down interval upper and lower edge coefficients which are determined according to the upper limit value and the lower limit value to obtain the new upper and lower edge coefficients.

For example, an input luminance range L1<=L0<=L2 of the focus area of the image is obtained statistically, and then it is determined that L1 and L2 are in the five equal intervals determined in Step S200, wherein it is assumed that L1 and L2 are set as: 1/5<=L1<=2/5, 2/5<=L2<=3/5. The interval upper and lower edge coefficients determined by L1 and L2 are scaled up or down proportionally according to a scale (referred to as adjustment factor) to obtain new upper and lower edge coefficients. In this example, L1 corresponds to a lower limit coefficient P1, and L2 corresponds to an upper limit coefficient P3. It is assumed that the adjustment factor is set as 1.2. Scaling down P1 by the factor of 1.2 yields P1=0.16, and scaling up P3 by the factor of 1.2 yields P3=0.72. Accordingly, the corresponding new upper and lower edge coefficients can be obtained according to the adjustment factor.

The interval upper and lower edge coefficients are scaled up or down based on the coefficient adjustment factor that may be selected based on conditions of the image.

Step S400: adjusting the mapping relationship curve according to the new upper and lower edge coefficients to adjust the focus area of the target image.

Figure 2:
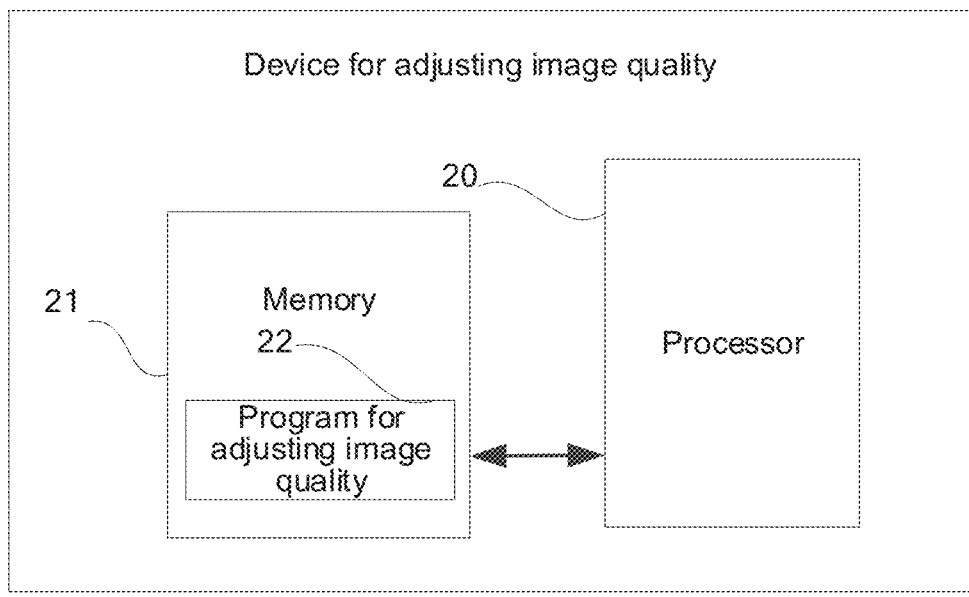
FIG. 2 is a schematic structure diagram of a device for adjusting image quality according to a preferred embodiment of the present disclosure.
Figures 1, 3:
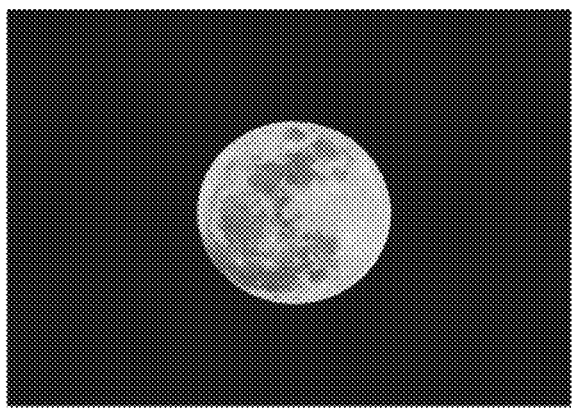
Figures 2, 3:
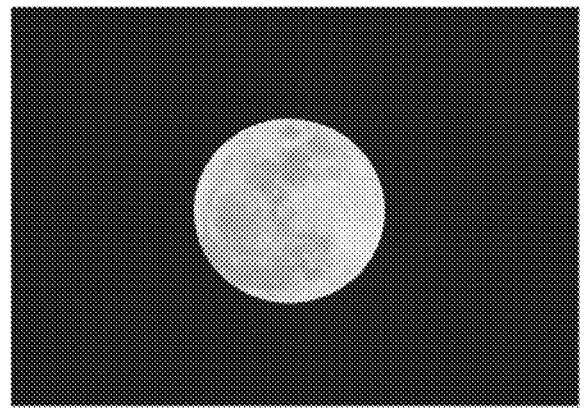
Figures 1, 4:
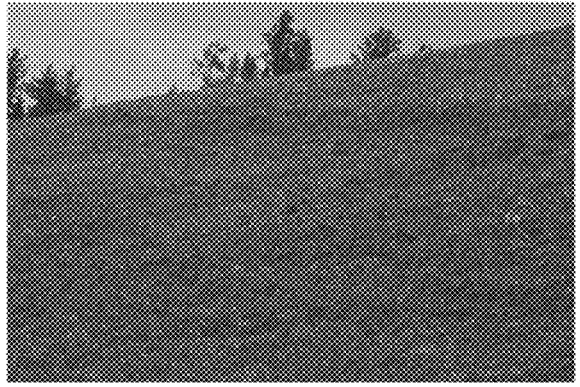
Figures 2, 4:

Specifically, the luminance and contrast of the image can be adjusted in real-time by applying the above adjusted upper and lower edge coefficients to the mapping relationship between the input luminance and the output luminance of the focus area of the image expressed by the fifth-order linear Bézier curve. Smooth and continuous luminance changes in the adjusted image and coherence of image display before and after the image adjustment can be obtained without inconsistent appearance, and the image quality becomes brighter and more colorful, which greatly improves the contrast level of the specific areas of the image. FIG. 3-1 and FIG. 4-1 respectively show an example 1 and an example 3 of original images without image quality adjustment using the method of adjusting image quality of the present disclosure, and FIG. 3-2 and FIG. 4-2 show an image example 2 and an example 4 of images which are obtained from the images of FIG. 3-1 and FIG. 4-1 adjusted using the method of adjusting image quality of the present disclosure, respectively. It can be seen from FIG. 3-2 that the luminance and contrast level of the lunar sphere in the middle focus position of the adjusted image become greater, and the image quality is brighter. As shown in FIG. 4-2, the luminance of the grass, sky, and trees in the adjusted image is adjusted, which induces better sense of level and brighter and more colorful image quality. Accordingly, the method of the present disclosure can significantly improve the quality of the image.

The present disclosure also provides a device for adjusting image quality. FIG. 2 shows a schematic structure diagram of a preferred embodiment of a device for adjusting image quality of the present disclosure. The device for adjusting image quality comprises a processor 20, a memory 21, and a program 22 for adjusting image quality that is stored in the memory 21 and executable by the processor 20. The program 22 for adjusting image quality is executed by the processor 20 to perform the following steps of:

selecting by a display device system a focus area of a target image;

outputting a mapping relationship curve of an input luminance value and an output luminance value of the target image;

calculating the input luminance value range of the pixels in the focus area of the target image and proportionally adjusting upper and lower edge coefficients of the input luminance value range to obtain new upper and lower edge coefficients;

adjusting the mapping relationship curve according to the new upper and lower edge coefficients, to adjust the focus area of the target image.

Other specific steps performed by the program 22 for adjusting image quality are the same as the steps in the preferred embodiment of the foregoing method and can be referred t to the steps in the preferred embodiment of the foregoing method, which is not repeated here. The effect achieved by adjusting image quality through the device can be referred to the preferred embodiment of the above method, and is not repeated here.

The processor 20 may be implemented by a central processing unit (CPU), a general-purpose processor, a digital signal processor (DSP), an application specific integrated circuit (ASIC), a field-programmable gate array (FPGA) or another programmable logic device, discrete gates or transistor logic devices, discrete hardware components, etc. The general-purpose processor may be a microprocessor, or the processor may be any conventional processor or the like.

The memory 21 may be an internal storage unit of the device for adjusting image quality, for example, a hard disk or a memory of the device for adjusting image quality. The memory 21 may also be an external storage device of the device for adjusting image quality, for example, a plug-in hard disk equipped on the device for adjusting image quality, a smart memory card (SMC), a secure digital (SD) card, a flash card, etc. Further, the memory 21 may also include both an internal storage unit and an external storage device of the device for adjusting image quality. The memory 21 is used to store the computer program and other programs and data required by the device for adjusting image quality. The memory 21 may be used further to temporarily store data that has been output or will be output.

The present disclosure also provides a readable storage medium that stores a program for adjusting image quality. When the program for adjusting image quality is executed by a processor, the program for adjusting image quality realizes the steps of the aforementioned method for adjusting image quality. The specific steps are the same as the steps of the aforementioned method for adjusting image quality, and the resulted program for adjusting image quality is also the same as that described in the preferred embodiment of the aforementioned method. The related description will not be repeated here.

It should be understood that the above descriptions are related to only preferred embodiments of the present disclosure and not intended to limit the technical solutions of the present disclosure. For those of ordinary skill in the art, addition/reduction, replacement, modification, or improvement is allowed for the technical solutions within the spirit and principle of the present disclosure. The technical solutions after the addition/reduction, replacement, modification, or improvement should be covered by the protected scope of the appended claims of the present disclosure.

What is claimed is:

1. A method for adjusting image quality, applied in a display device system, comprising the following steps: selecting by the display device system a focus area of a target image; outputting a mapping relationship curve of an input luminance value and an output luminance value of the target image; calculating an input luminance value range of pixels in the focus area of the target image and proportionally adjusting upper and lower edge coefficients of the input luminance value range to obtain new upper and lower edge coefficients; and adjusting the mapping relationship curve according to the new upper and lower edge coefficients to adjust the focus area of the target image; wherein the outputting the mapping relationship curve of the input luminance value and the output luminance value of the target image comprises calculating using a linear Bézier curve to initially describe the mapping relationship curve of the input luminance value and the output luminance value; wherein the calculating the input luminance value range of the pixels in the focus area of the target image and proportionally adjusting the upper and lower edge coefficients of the input luminance value range to obtain the new upper and lower edge coefficients comprises: determining an upper limit value and a lower limit value of a Bézier curve of a ratio of the input luminance value and a maximum input luminance value of the pixels in the focus area of the target image; and proportionally scaling up or down interval upper and lower edge coefficients which are determined according to the upper limit value and the lower limit value of the Bézier curve to obtain the new upper and lower edge coefficients; wherein the linear Bézier curve is implemented by a fifth-order Bézier curve.

2. The method for adjusting image quality of claim 1, wherein the focus area of the target image selected by the display device system is a central area in an image display of the target image.

3. The method for adjusting image quality of claim 2, wherein when resolution of a current image is 3840×2160, the pixels in the central area of the target image are generally located in pixel ranges 1600<x<2260 and 900<y<1260, where x is the coordinate in the length direction of the image, y is the coordinate in the width direction of the image, and the origin of coordinates of the image display is at the upper left corner.

4. The method for adjusting image quality of claim 2, wherein the focus area of the target image selected by the display device system is an image area of interest.

5. The method for adjusting image quality of claim 4, wherein the image area of interest is obtained through artificial intelligence training.

6. The method for adjusting image quality of claim 4, wherein the image area of interest is an image area that is recognized through big data collection.

7. The method for adjusting image quality of claim 1, wherein the 5th-order linear Bézier curve is described as $Lt = Ltmax \times \Sigma C(N,k) \times L0^k \times (1-L0)^{\wedge}(N-k) \times pk$, wherein $C(N,k)$ indicates permutations of k elements among N (N=5) elements, Ltmax represents a maximum output luminance supported by a current display device, L0 represents a ratio of the input luminance value to the maximum input luminance value, k iterates from 1 to 5, and pk represents a sequence of coefficients, initially, $pk = k/5$, the input is correlated with the output in a linear relationship, and the luminance ratio L0 is divided into five equal intervals.

8. The method for adjusting image quality of claim 1, wherein the interval upper and lower edge coefficients are scaled up or down proportionally based on an adjustment factor which is selected based on conditions of images.

9. The method for adjusting image quality of claim 8, wherein, by applying the above adjusted upper and lower edge coefficients to the mapping relationship between the input luminance and the output luminance of the focus area of the image expressed by the fifth-order linear Bézier curve, luminance and contrast of the image can be adjusted in real-time.

10. The method for adjusting image quality of claim 1, wherein the focus area of the target image selected by the display device system is an image area of interest the image area that is recognized through the artificial intelligence training or the big data collection is customized by a user according to specific requirements for image recognition.

11. A device for adjusting image quality, comprising:
a processor and a memory communicatively connected to the processor, wherein the memory stores a computer program, and the computer program, when being executed by the processor, performs the steps of the method in claim 1,
wherein the processor is configured to call the computer program in the memory to perform the steps of the method for adjusting image quality in claim 1.

12. A non-transitory readable storage medium, wherein the readable storage medium stores a program for adjusting image quality, wherein the program for adjusting image quality, when being executed by a processor, performs the steps of the method for adjusting image quality in claim 1.

* * * * *

UNITED STATES PATENT AND TRADEMARK OFFICE
CERTIFICATE OF CORRECTION

PATENT NO. : 11,756,506 B2
APPLICATION NO. : 17/618518
DATED : September 12, 2023
INVENTOR(S) : Daxue Xia et al.

It is certified that error appears in the above-identified patent and that said Letters Patent is hereby corrected as shown below:

On the Title Page

Item (30) Foreign Application Priority Data:
"20191056986.X"
Should be changed to:
-- 201910569860.X --

Signed and Sealed this
Nineteenth Day of December, 2023

Katherine Kelly Vidal
*Director of the United States Patent and Trademark Office*